US012812246B2

(12) United States Patent
Iwasaki

(10) Patent No.: US 12,812,246 B2
(45) Date of Patent: Nov. 24, 2026

(54) FOCUS ADJUSTMENT APPARATUS AND METHOD, IMAGE CAPTURING APPARATUS, AND STORAGE MEDIUM

(71) Applicant: CANON KABUSHIKI KAISHA, Tokyo (JP)

(72) Inventor: Naoki Iwasaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 9 days.

(21) Appl. No.: 18/937,209

(22) Filed: Nov. 5, 2024

(65) Prior Publication Data

US 2025/0168508 A1 May 22, 2025

(30) Foreign Application Priority Data

Nov. 16, 2023 (JP) ................................ 2023-195297

(51) Int. Cl.
*H04N 23/68* (2023.01)
*H04N 23/67* (2023.01)

(52) U.S. Cl.
CPC ....... *H04N 23/6811* (2023.01); *H04N 23/675* (2023.01)

(58) Field of Classification Search
CPC ............ H04N 23/6811; H04N 23/675; H04N 23/611; H04N 23/672
See application file for complete search history.

(56) References Cited

U.S. PATENT DOCUMENTS

2020/0236291 A1* 7/2020 Hoshino ................ H04N 23/62
2022/0094840 A1* 3/2022 Hongu ................... G03B 13/36
2022/0264025 A1* 8/2022 Wada ................... H04N 23/675

FOREIGN PATENT DOCUMENTS

JP H01288816 A 11/1989
JP 2011090048 A 5/2011
JP 2012203207 A 10/2012
JP 2013160991 A 8/2013
JP 2013219615 A 10/2013
JP 2018004918 A 1/2018
JP 2018197845 A 12/2018
JP 2019197295 A 11/2019
JP 2023095509 A 7/2023

* cited by examiner

*Primary Examiner* — Twyler L Haskins
*Assistant Examiner* — John H Morehead, III
(74) *Attorney, Agent, or Firm* — Cowan, Liebowitz & Latman, P.C.

(57) ABSTRACT

A focus adjustment apparatus includes a subject detection unit configured to detect a subject from an image, a motion detection unit configured to detect a motion and store a history of the motion for the detected subject, a focus adjustment unit configured to focus on a subject; and a prediction unit configured to predict, when the focus adjustment unit shifts from a state of focusing on a first subject to a state of focusing on a second subject, a focus adjustment position for the focus adjustment unit to focus on the second subject based on a history of a motion of the second subject stored by the motion detection unit.

10 Claims, 11 Drawing Sheets

FOCUS ADJUSTMENT APPARATUS AND METHOD, IMAGE CAPTURING APPARATUS, AND STORAGE MEDIUM

BACKGROUND OF THE INVENTION

Field of the Invention

The present invention relates to a focus adjustment apparatus and method used in an image capturing apparatus.

Description of the Related Art

In recent years, various autofocus (AF) methods such as an imaging plane phase difference AF method using an image capturing element and a contrast AF method have been put to practical use. Furthermore, there is known, in the various AF methods, technique for identifying and focusing a region of a main subject.

Japanese Patent Laid-Open No. 2013-160991 discloses a technique of estimating a moving direction of a subject by detecting a change in size and position of a feature region in a photographing screen based on a plurality of images generated in time series, and performing a focusing operation according to an estimation result.

In addition, Japanese Patent Laid-Open No. 2012-203207 discloses an image capturing apparatus including a capture determination means that performs a focus adjustment operation in a case where a change amount of an image plane position at the time of focus detection is less than a preset threshold value. When a condition determined in advance is satisfied and the subject and the image capturing apparatus are in a stationary state, the threshold value of the capture determination means is set to be larger than a preset value, thereby improving the focus tracking accuracy.

However, in Japanese Patent Laid-Open No. 2013-160991, the motion determination of the subject is based only on the size, position, and focus detection information of the subject, and it cannot be determined whether or not the subject is in a preferable state as the main subject.

In Japanese Patent Laid-Open No. 2012-203207, although the focus trackability can be improved only at the start of AF, it is not possible to apply the focus tracking to a subject preferable as a main subject after the start of AF.

SUMMARY OF THE INVENTION

The present invention has been made in view of the above-described problems, and provides an image capturing apparatus that can focus on a subject at a timing appropriate for photographing.

According to a first aspect of the present invention, there is provided a focus adjustment apparatus comprising at least one processor or circuit configured to function as: a subject detection unit configured to detect a subject from an image; a motion detection unit configured to detect a motion and store a history of the motion for the detected subject; a focus adjustment unit configured to focus on a subject; and a prediction unit configured to predict, when the focus adjustment unit shifts from a state of focusing on a first subject to a state of focusing on a second subject, a focus adjustment position for the focus adjustment unit to focus on the second subject based on a history of a motion of the second subject stored by the motion detection unit.

According to a second aspect of the present invention, there is provided an image capturing apparatus comprising: an imaging device configured to capture an image of an object; and the focus adjustment apparatus described above.

According to a third aspect of the present invention, there is provided a focus adjustment method comprising: executing subject detection for detecting a subject from an image; executing motion detection of detecting a motion and storing a history of the motion for the detected object; executing focus adjustment for focusing on a subject; and predicting, when shifting from a state of focusing on a first subject to a state of focusing on a second subject in the focus adjustment, a focus adjustment position for focusing on the second subject in the focus adjustment based on a history of a motion of the second subject stored in the motion detection.

Further features of the present invention will become apparent from the following description of exemplary embodiments with reference to the attached drawings.

DESCRIPTION OF THE EMBODIMENTS

Figure 1:
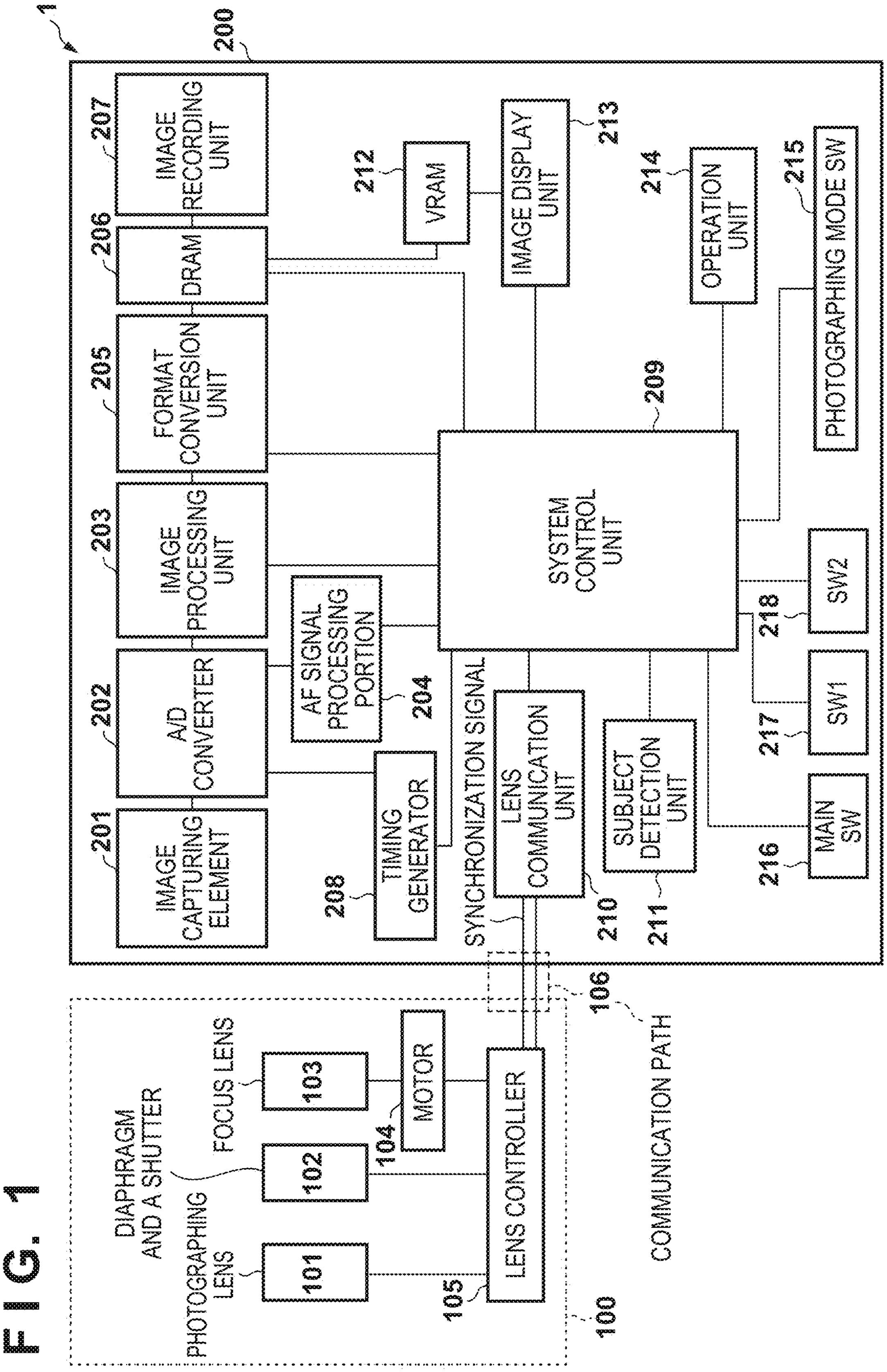
FIG. 1 is a block diagram illustrating a configuration of an image capturing apparatus according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

<Configuration of Image Capturing Apparatus>

FIG. 1 is a block diagram illustrating a configuration of an interchangeable lens camera 1 (hereinafter, simply referred to as a camera) which is an embodiment of an image capturing apparatus of the present invention. The camera 1 of the present embodiment can perform focus adjustment by an imaging plane phase difference detection method using an output signal from an image capturing element 201 that captures a subject image.

In FIG. 1, the camera 1 includes a lens apparatus (interchangeable lens) 100 and a camera body 200. When the lens apparatus 100 is mounted on the camera body 200 via a mount portion (not illustrated) having an electrical contact unit 106, a lens controller 105 that integrally controls the operation of the lens apparatus 100 and a system control unit 209 that integrally controls the operation of the entire camera can communicate with each other.

First, the configuration of the lens apparatus 100 will be described. The lens apparatus 100 includes a photographing lens 101 having a zoom mechanism, a diaphragm and a shutter 102 configured to control light amount, a focus lens 103 configured to focus on an image capturing element 201, a motor 104 configured to drive the focus lens, and a lens controller 105.

Next, the configuration of the camera body 200 will be described. The camera body 200 is configured to be able to acquire an imaging signal from a light flux passing through the photographing optical system of the lens apparatus 100. The camera body 200 includes an image capturing element 201 that photoelectrically converts reflected light from a subject into an electric signal, an A/D converter 202 including a CDS circuit that removes output noise of the image capturing element 201 and a non-linear amplifier circuit that is performed before A/D conversion, an image processing unit 203, and an AF signal processing unit 204. In addition, the camera body 200 includes a format conversion unit 205, a high-speed built-in memory (e.g., a random access memory etc., referred to as DRAM in the following) 206, and an image recording unit 207 including a recording medium such as a memory card and an interface thereof. Furthermore, the camera body 200 includes a timing generator 208, a system control unit 209 that controls a system such as a photographing sequence, a lens communication unit 210 that performs communication between the camera body 200 and the lens apparatus 100, a subject detection unit 211 that detects a subject from a video, and an image display memory (hereinafter referred to as VRAM) 212.

Furthermore, the camera body 200 includes an image display unit 213 that performs an image display, a display for operation assistance, and a display of camera state, and displays a photographing screen and a focus detection region at the time of photographing. In addition, the camera includes an operation unit 214 configured to operate the camera body 1 from outside, a photographing mode switch 215 configured to select a photographing mode such as a macro mode or a sport mode, and a main switch 216 configured to turn on the power of the camera 1.

In addition, a switch (hereinafter referred to as SW1) 217 for performing a photographing standby operation such as autofocus (AF) or auto exposure control (AE), and a photographing switch (hereinafter referred to as SW2) 218 for performing photographing after the operation of the switch SW1 are provided. The DRAM 206, which is a built-in memory, is used as a temporary image storage means, that is, a high-speed buffer, or as a working memory in the case of processing an image. The operation unit 214 includes, for example, the following. A menu switch that performs various settings such as a photographing function of the image capturing apparatus and settings at the time of image reproduction, an operation mode switching switch between a photographing mode and a reproduction mode, and the like.

The image capturing element 201 includes a CCD or a CMOS sensor. Each pixel of the image capturing element 201 used in the present embodiment is configured by including two (a pair of) photodiodes A and B, and one microlens provided for the pair of photodiodes A and B. Each pixel divides incident light by a microlens to form a pair of optical images on the pair of photodiodes A and B. Then, the pair of photodiodes A and B output a pair of pixel signals (an A signal and a B signal) used for an AF (autofocus) signal described later. Furthermore, an imaging signal (A+B signal) can be obtained by adding the outputs of the pair of photodiodes A and B.

By combining a plurality of A signals and a plurality of B signals output from a plurality of pixels, respectively, a pair of image signals (A image signal and B image signal) serving as AF signals (focus detection signals) used for AF by an imaging plane phase difference detection method (hereinafter referred to as "imaging plane phase difference AF") is obtained.

The AF signal processing unit 204 performs correlation calculation on the pair of image signals to calculate a phase difference (hereinafter referred to as image shift amount) that is a shift amount of the pair of image signals, and further calculates, from the image shift amount, a defocus amount (and a defocus direction and reliability) of the photographing optical system from the image shift amount. It is assumed that the AF signal processing unit 204 calculates a plurality of defocus amounts in a predetermined region that can be designated.

<Operation of Image Capturing Apparatus>

Figure 2:
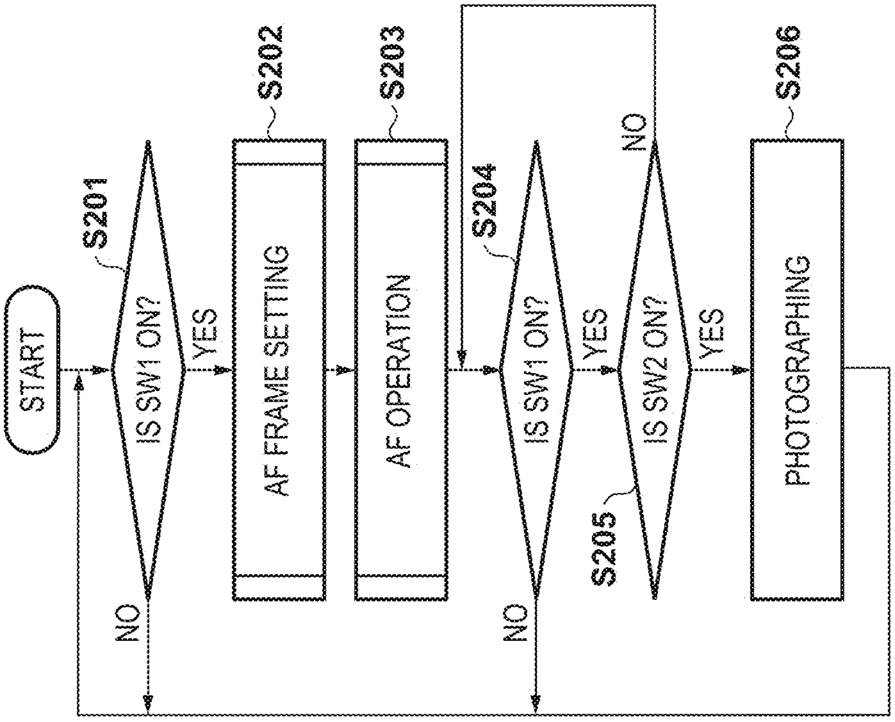
FIG. 2 is a flowchart describing an operation of the image capturing apparatus.

In the following, an operation of the image capturing apparatus according to the present embodiment will be described, referring to FIG. 2. FIG. 2 is a flowchart illustrating a flow of an imaging control process in a case where still image capturing is performed from a state where a live view image is displayed. The system control unit 209 serving as a computer executes this process according to a control program serving as a computer program.

First, in step S201, the system control unit 209 checks the state of the switch SW1 (217). If the switch SW1 is ON, the system control unit 209 proceeds the process to step S202, and otherwise, stands by as it is.

In step S202, the system control unit 209 performs AF frame setting on the AF signal processing unit 204. Details of the AF frame setting will be described later.

In step S203, the system control unit 209 performs the AF operation. Details of the AF operation will be described later.

In step S204, the system control unit 209 checks the state of the switch SW1 (217). If the switch SW1 is ON, the system control unit 209 proceeds the process to step S205, and otherwise, returns the process to step S201.

In step S205, the system control unit 209 checks the state of the switch SW2 (218). If the switch SW2 is ON, the system control unit 209 proceeds the process to step S206, and otherwise, returns the process to step S204.

In step S206, the system control unit 209 executes the photographing operation, and returns the process to step S201.

<AF Frame Setting>

Figure 3:
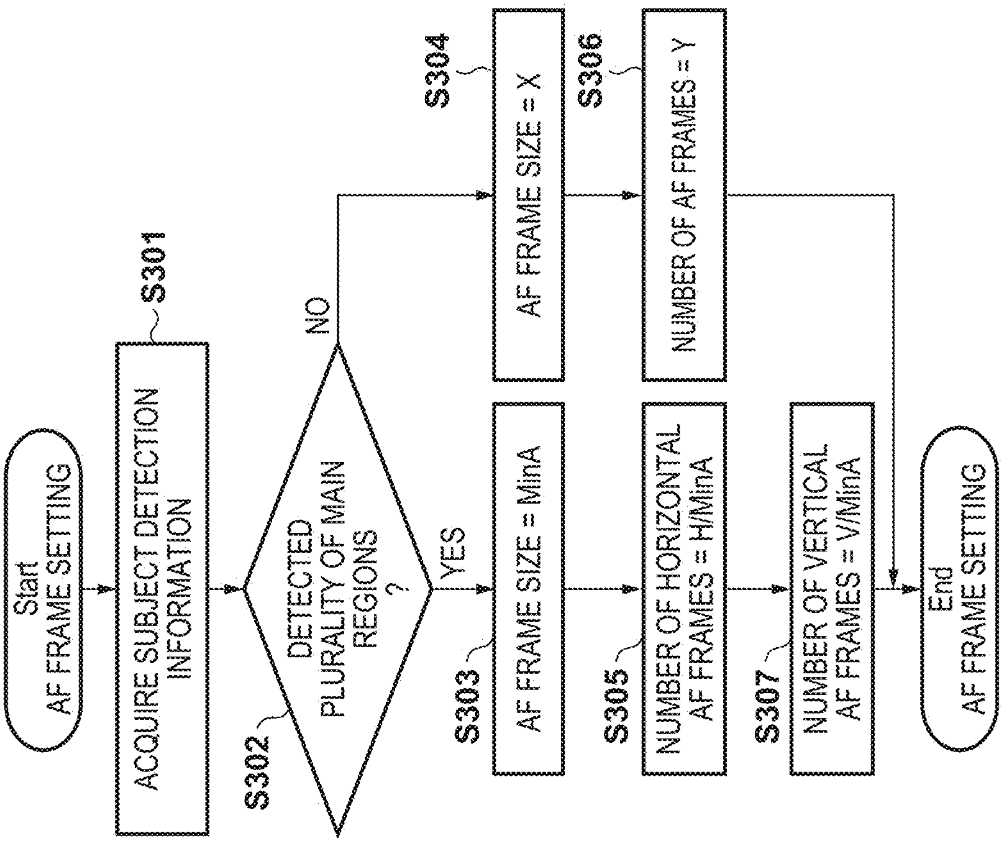
FIG. 3 is a flowchart describing an operation of AF frame setting.

FIG. 3 is a flowchart describing the operation of AF frame setting in step S202 in FIG. 2.

First, in step S301, the system control unit 209 acquires subject detection information from the subject detection unit 211. The subject of the present embodiment is a person, and a main region in the subject is further detected. Here, the main regions are a pupil, a face, or a body of a person or an animal. For these detection methods, a learning method by known machine learning, a recognition process by an image processing means, and the like are used.

For example, there are the following types of machine learning:

(1) Support Vector Machine
(2) Convolutional Neural Network
(3) Recurrent Neural Network In addition, as an example of a recognition process, there is known a method in which a skin color region is extracted from gradation colors of each pixel represented by image data, and the face is detected according to a degree of matching with a contour plate of a face prepared in advance. Furthermore, there is also known a method in which face detection is performed by extracting feature points of a face such as an eye, a nose, or a mouth using a well-known pattern recognition technique.

Furthermore, by applying these techniques, it is also possible to estimate the posture of the subject from the feature amount of the joint of the human body or the like, and to detect an important state (hereinafter, action) of the subject in a sport scene. As a result, it is possible to detect, for example, a shooting posture in soccer or basketball, and an attack posture in volleyball. This action detection method is used in an action detection process (state detection process) in step S800 in FIG. 9 described later.

The subject detection unit 211 can detect a plurality of subjects, and manages which subject's detection information is related to these detected results by a subject ID. That is, the subject IDs are different among different subjects. In a case where a plurality of subjects are detected, a main subject whose focus is to be tracked is selected from the plurality of subjects. A subject other than the main subject is referred to as a sub-subject.

In the present embodiment, a subject determined to have caused an action by the above-described action detection method is set as a main subject. Although a plurality of methods such as a center priority method and a size priority method can be considered as a main subject determination method in a case where all subjects have not taken an action, they are not related to the gist of the present invention, and thus a detailed description thereof will be omitted. Furthermore, the main region detection method applicable to the present invention is not limited to these methods, and other methods may be used.

In step S302, the system control unit 209 determines whether or not a plurality of main regions are detected for the detection result of the subject detection unit 211. When a plurality of main regions are detected, the system control unit 209 proceeds the process to step S303, and otherwise, proceeds the process to step S304. Here, the main region is a face, a body, an eye in the face, a nose, a mouth, or the like of the subject.

Figure 4A:
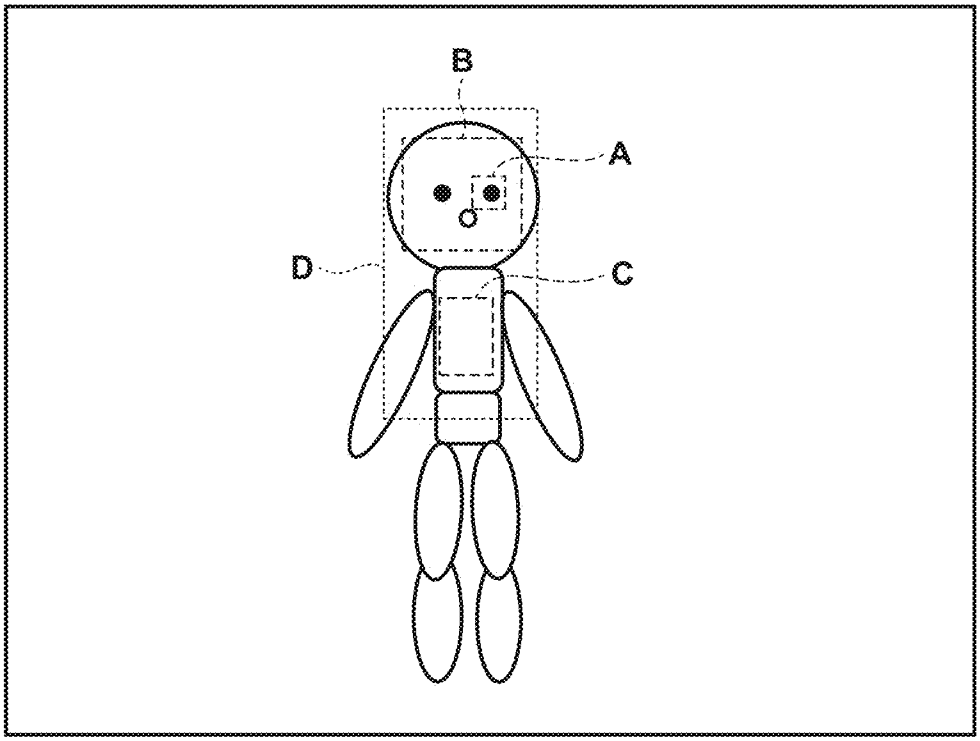
FIG. 4A is a conceptual diagram of a detected region with respect to a pupil, a face, and a body of a person.

The concept of the main region detected here will be described with reference to FIG. 4A. FIG. 4A illustrates a state in which a pupil A, a face B, and a body C are detected. It is assumed that the type of subject such as person or animal, as well as the center coordinate, the horizontal size, and the vertical size in each detected main region can be acquired from the subject detection unit 211.

In step S303, the system control unit 209 inputs a smaller value of the horizontal and vertical sizes of the minimum detected main region, that is, the pupil A in FIG. 4A, to MinA, and sets MinA as one AF frame size.

Figure 4B:
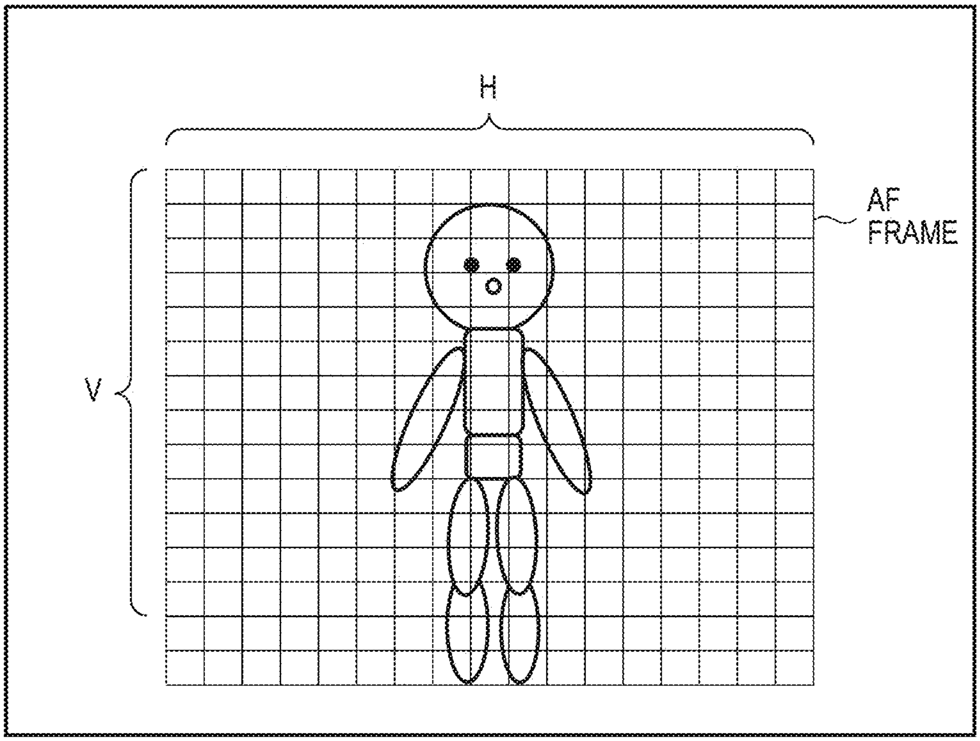
FIG. 4B is a conceptual diagram of AF frame setting with respect to a pupil, a face, and a body of a person.

In step S305, the system control unit 209 obtains the horizontal size H in FIG. 4A including the entire main region from the horizontal coordinate and the horizontal size of each detected main region. Then, as illustrated in FIG. 4B, the number of horizontal AF frames is determined by dividing the horizontal size H by the AF frame size MinA.

In step S307, the system control unit 209 obtains the vertical size Vin FIG. 4A including the entire main region from the vertical coordinate and the vertical size of each detected main region. Then, as illustrated in the 4B, the number of vertical AF frames is determined by dividing the vertical size V by the AF frame size MinA, and the AF frame setting is ended.

Here, an inclusion region D is obtained by using the AF frame size. The inclusion region D may have a margin as illustrated in FIG. 4A with respect to the size including the pupil A, the face B, and the torso C in consideration of the motion of the subject and the detection error. A method of using the inclusion region D will be described later with reference to FIG. 8B. In the present embodiment, the size of the square region based on the minimum detected main region is the AF frame size, but the AF frame size may be varied horizontally and vertically, or the size divided by the number of AF frames that can be calculated by the system control unit 209 may be set.

In step S304, the system control unit 209 sets an AF frame of a predetermined size X with respect to the detected face. A pupil size estimated from the face may be set to the X, or a frame size may be set, with which an S/N can be secured and a sufficient focusing performance can be obtained taking into account a low illumination environment. In the present embodiment, it is assumed that X is set using the estimated pupil size.

In step S306, the system control unit 209 sets the number of AF frames Y that includes the region of the face B with the AF frame size X and can support even a case where the face moves.

<AF Operation>

Figure 5:
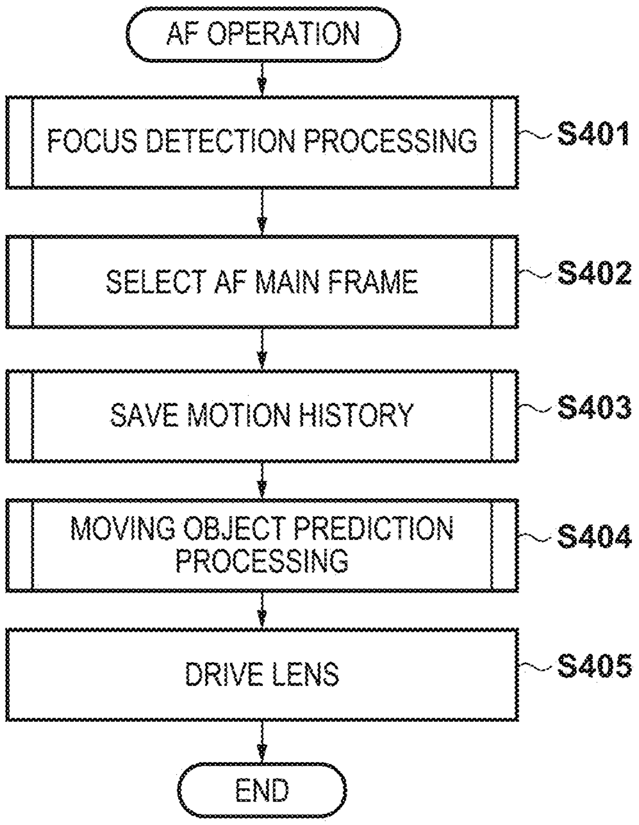
FIG. 5 is a flowchart describing an AF operation.

FIG. 5 is a flowchart describing the AF operation in step S203 in FIG. 2.

First, in step S401, the system control unit 209 performs focus detection process in each AF frame as illustrated in FIG. 4B, and detects the defocus amount and the reliability. The focus detection processing will be described below.

In step S402, the system control unit 209 performs AF main frame selection using the focus detection information obtained in step S401. Details of the AF main frame selection will be described later with reference to FIGS. 7A to 7C.

In step S403, the system control unit 209 saves the defocus amount of the AF frame selected in step S402, the defocus history of the AF frame selected in the past, and the subject information. Details of the saving of the motion history information will be described later with reference to FIG. 8A.

In step S404, the system control unit 209 predicts the movement position of the moving object by using the motion history information in step S403. Details of the prediction of the movement position of the moving body will be described later with reference to FIG. 9.

In step S405, the system control unit 209 performs lens driving in accordance with the prediction result calculated in step S404.

<Focus Detection Processing>

Figure 6:
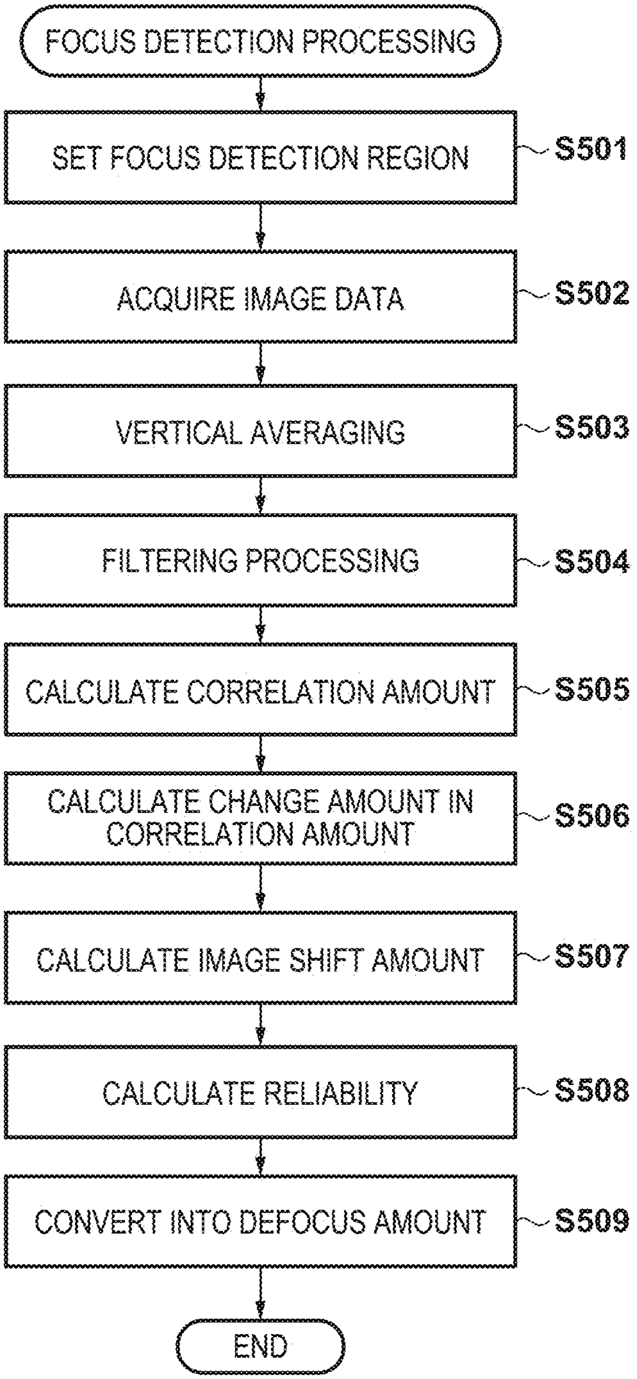
FIG. 6 is a flowchart describing focus detection process.

FIG. 6 is a flowchart describing the focus detection process in step S401 in FIG. 5.

First, in step S501, the system control unit 209 sets a focus detection region in an arbitrary range in the image data output from the image capturing element 201.

In step S502, the system control unit 209 acquires a pair of image signals (A image signal and B image signal) for focus detection from the image capturing element 201 corresponding to the focus detection region set in step S501.

In step S503, the system control unit 209 performs a row averaging process on the pair of image signals acquired in step S502 in the vertical direction. This processing can reduce the influence of noise of the image signal.

In step S504, the system control unit 209 performs filtering process of extracting signal components of a predetermined frequency band from the signals subjected to the row averaging process in the vertical direction in step S503.

In step S505, the system control unit 209 calculates a correlation amount from the signal filtered in step S504.

At step S506, the system control unit 209 calculates a change amount in correlation amount from the correlation amount calculated at step S505.

At step S507, the system control unit 209 calculates an image shift amount from the change amount in correlation amount calculated at step S506.

In step S508, the system control unit 209 calculates reliability representing a degree to which the image shift amount calculated at step S507 is reliable.

In step S509, the image shift amount is converted into the defocus amount, and the focus detection process is ended.

<AF Main Frame Selection>

Figure 7A:
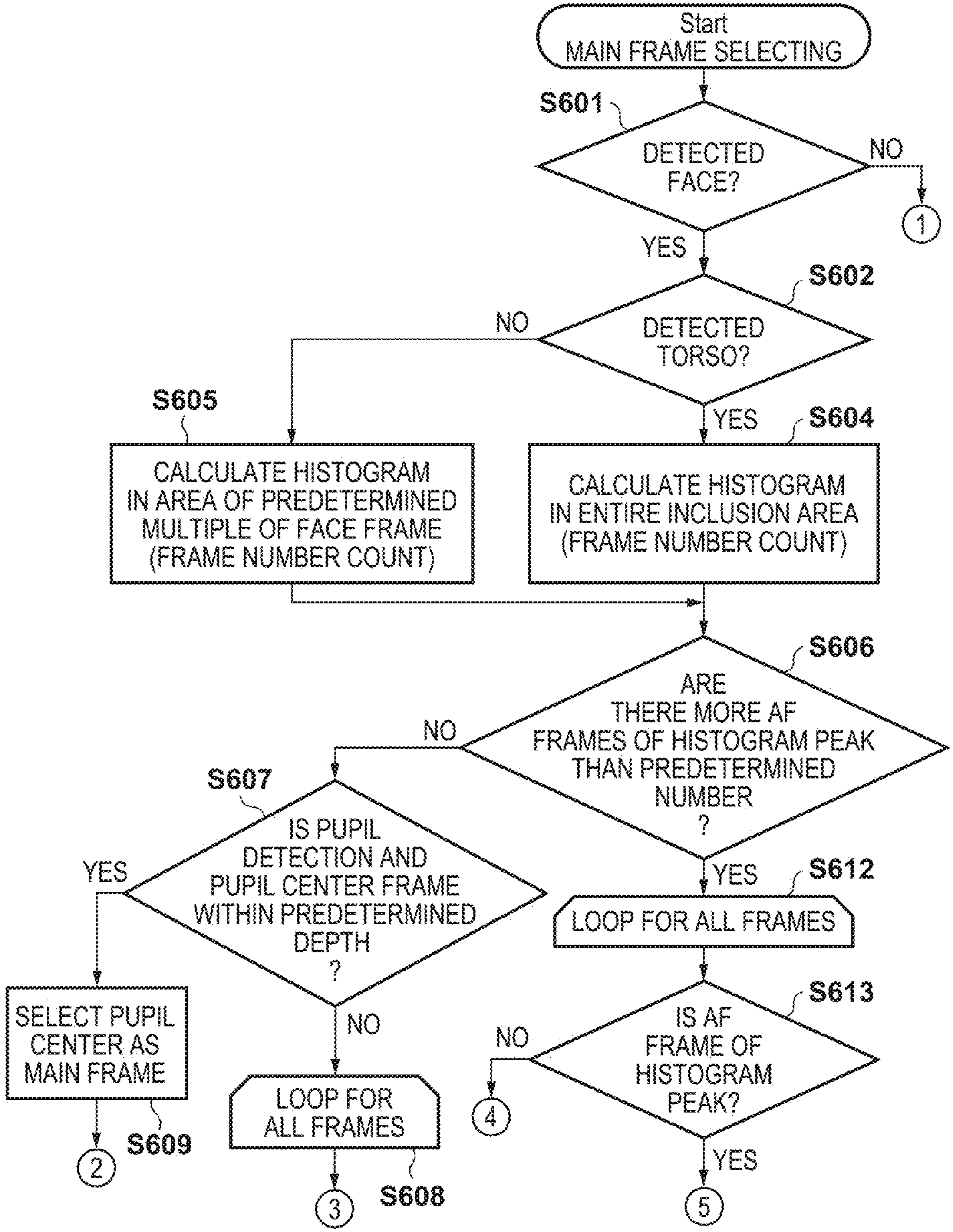
FIGS. 7A to 7C are flowcharts describing an AF main frame selecting process.
Figure 7B:
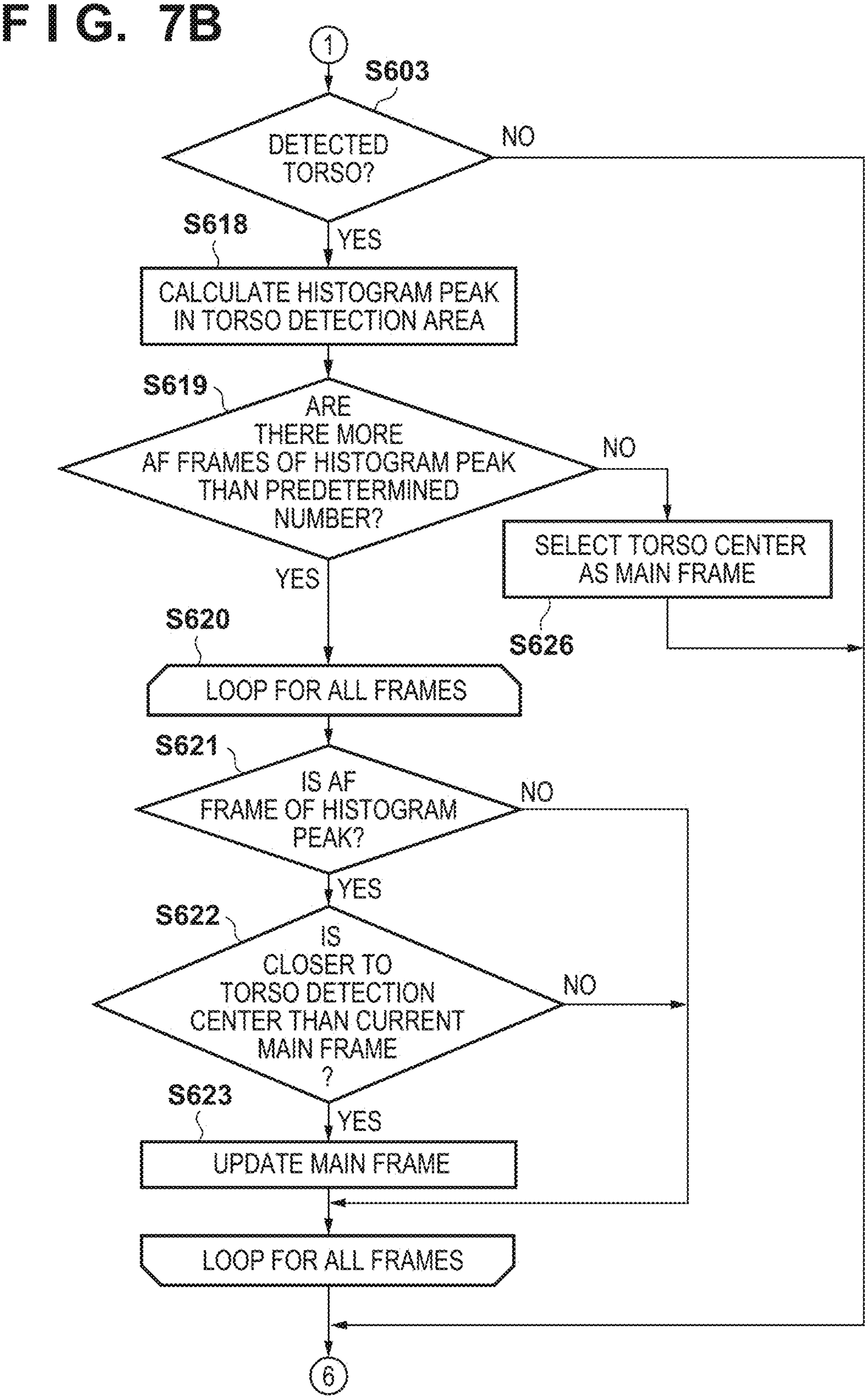
Figure 7C:
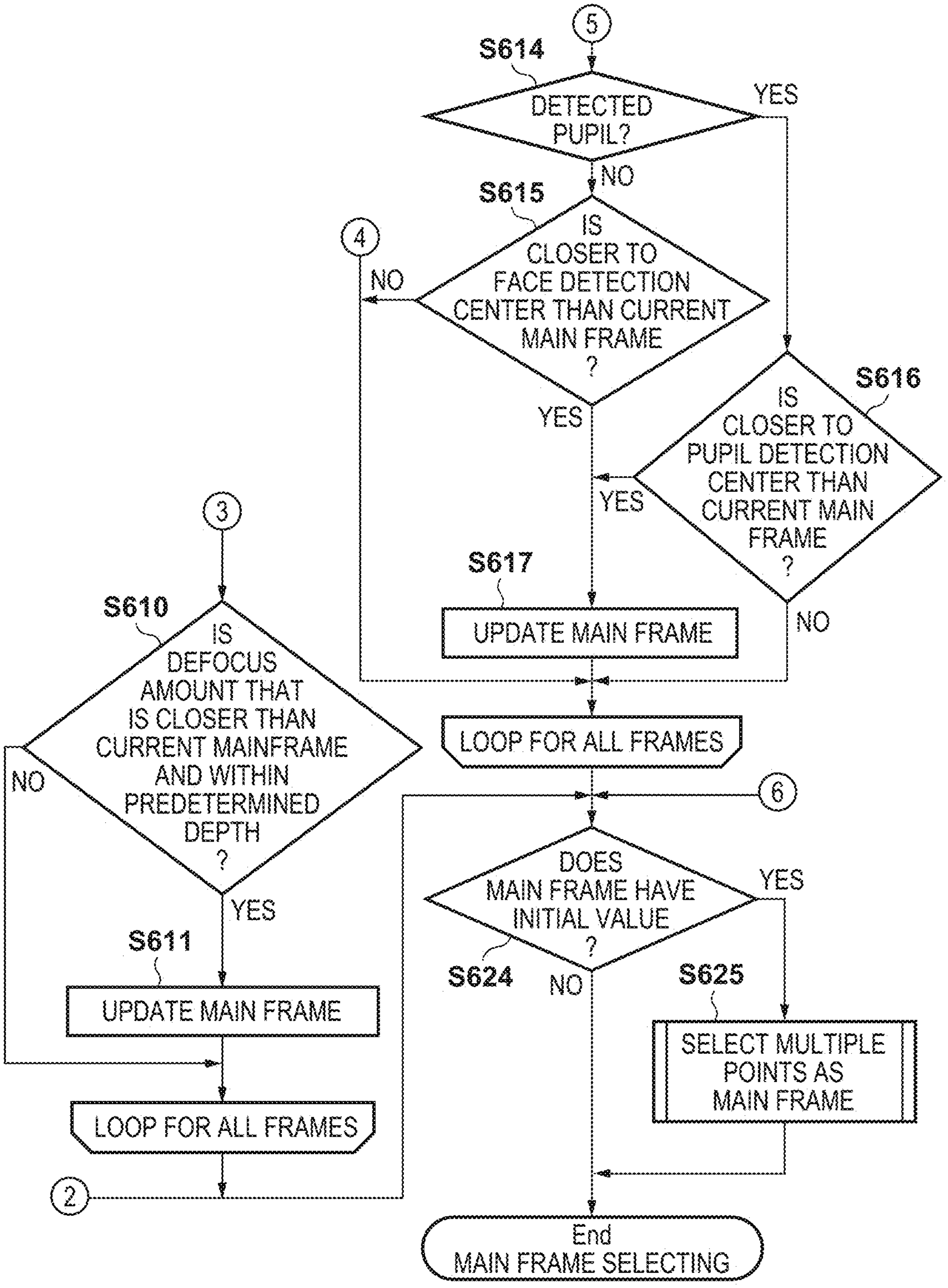

FIGS. 7A to 7C are flowcharts describing the operation of selecting the main frame in step S402 in FIG. 5. In the present embodiment, a histogram which is an image analyzing means is used, but since it is a general technique, the detailed description of the histogram will be omitted.

First, in step S601, the system control unit 209 determines whether or not a face of a person is detected by the subject detection unit 211. If a face is detected, the system control unit 209 proceeds the process to step S602, and if not detected, the system control unit proceeds the process to step S603.

In step S602, the system control unit 209 determines whether or not the torso of the person is detected by the subject detection unit 211. If a torso is detected, the system control unit 209 proceeds the process to step S604, and if not detected, the system control unit proceeds the process to step S605.

In step S604, the system control unit 209 counts the defocus amount calculated in the process in step S509 in FIG. 6 for each predetermined depth with respect to each AF frame of the region including the entire main region, and creates a histogram. This region may be the same as the inclusion region D described in FIG. 4A, or may be smaller than the inclusion region D in order to exclude components such as the background.

In the present embodiment, the defocus amount itself is formed into a histogram, but in consideration of a moving subject, a predicted value corresponding to the subject position may be obtained based on the defocus amount calculated for each AF frame, and the predicted value may be formed into a histogram.

In step S605, the system control unit 209 counts the defocus amount calculated for each AF frame set in a region of a predetermined multiple of the face frame for each predetermined depth to create a histogram.

In step S606, the system control unit 209 determines whether or not the peak value (the number of AF frames of the histogram peak) of the histogram created in step S604 or step S605 is greater than or equal to a predetermined number.

In this embodiment, the peak value of the histogram is normalized by the total number of AF frames, converted into a ratio, and used. If the peak value is greater than or equal to the predetermined ratio, the system control unit 209 proceeds the process to step S612, and if the peak value is less than the predetermined ratio, the system control unit proceeds the process to step S607.

In step S607, the system control unit 209 determines whether or not the pupil is detected and the AF frame at the pupil center is within a predetermined depth from the focus lens position when the defocus amount is calculated. In general, the subject detection information in a focused state has higher accuracy, and there is a possibility that the subject detection information is erroneously detected in a case of a defocus amount of greater than or equal to a predetermined depth. Therefore, such conditions are used. In a case where the pupil is detected and the pupil center frame is within the predetermined depth, the system control unit 209 proceeds the process to step S609, and sets the AF frame at the pupil center as the main frame, and in other cases, the system control unit proceeds the process to step S608.

In step S608, the system control unit 209 performs a loop process for all frames in order to select the main frame from the set AF frames. In addition, as the initial value of the main frame, information (the total number of frames+1 etc.) by which it can be determined that the main frame is not selected is assumed to be already set, and the drawing is omitted.

In step S610, the system control unit 209 determines whether or not the AF frame to be processed is the defocus amount closer than the currently selected main frame and within a predetermined depth. If the condition is satisfied, the system control unit 209 proceeds the process to step S611, and otherwise returns the process to step S608 and repeats the loop.

In step S611, the system control unit 209 updates the main frame. By repeating this loop, the AF frame that is the closest and is within the predetermined depth is selected as the main frame.

In step S612, similarly to step S608, the system control unit 209 performs the loop process for all frames in order to select the main frame from the set AF frames.

In step S613, the system control unit 209 determines whether or not the AF frame is an AF frame counted as a histogram peak. If so, the system control unit 209 proceeds the process to step S614, and if not, the system control unit repeats the loop process of step S612.

In step S614, the system control unit 209 determines whether or not a pupil is detected. If a pupil is detected, the system control unit 209 proceeds the process to step S616, and if not, the system control unit proceeds the process to step S615.

In step S615, the system control unit 209 determines whether or not the AF frame to be processed is a frame whose coordinates are closer to the face detection center than the currently selected main frame. If it is close, the system control unit 209 proceeds the process to step S617 and updates the main frame. Otherwise, the loop process of step S612 is repeated.

In step S616, the system control unit 209 determines whether or not the AF frame to be processed is a frame whose coordinates are closer to the pupil detection center than the currently selected main frame. If it is close, the system control unit 209 proceeds the process to step S617 and updates the main frame. Otherwise, the loop process of step S612 is repeated. By repeating this loop, the AF frame closest to the pupil center or the face center is detected as the main frame among the AF frames counted as the histogram peaks.

In step S603, the system control unit 209 determines whether or not the torso is detected by the subject detection unit 211. If a torso is detected, the system control unit 209 proceeds the process to step S618, and if not detected, the system control unit proceeds the process to step S624.

In step S618, the system control unit 209 creates a histogram in the torso detection area and obtains a histogram peak.

In step S619, the system control unit 209 determines whether or not the peak value of the histogram created in step S618 is greater than or equal to a predetermined ratio. If the peak value is greater than or equal to the predetermined ratio, the system control unit 209 proceeds the process to step S620, and if the peak value is less than the predetermined ratio, the system control unit proceeds the process to step S626.

In step S626, the system control unit 209 selects the torso center as the main frame.

In step S620, similarly to step S608, the system control unit 209 performs the loop process for all frames in order to select the main frame from the set AF frames.

In step S621, the system control unit 209 determines whether or not the AF frame is an AF frame counted as a histogram peak. If so, the system control unit 209 proceeds the process to step S622, and if not, the system control unit repeats the loop process of step S620.

In step S622, the system control unit 209 determines whether or not the AF frame to be processed is a frame whose coordinates are closer to the torso detection center than the currently selected main frame. If it is close, the system control unit 209 proceeds the process to step S623, and if not, repeats the loop process of step S620.

In step S623, the system control unit 209 updates the main frame. By repeating this loop, the AF frame closest to the center of the moving object is detected as the main frame among the AF frames counted as the histogram peaks.

In step S624, the system control unit 209 determines whether or not the main frame has been selected by the above-described flow based on whether or not the main frame has an initial value. If the main frame has the initial value, the main frame has not been selected, and thus the process proceeds to step S625, and if not, the main frame selecting process is ended.

In step S625, the system control unit 209 performs processes such as main frame selection in a predetermined region in the screen without using the detection information.

<Motion History Saving Process>

Figure 8A:
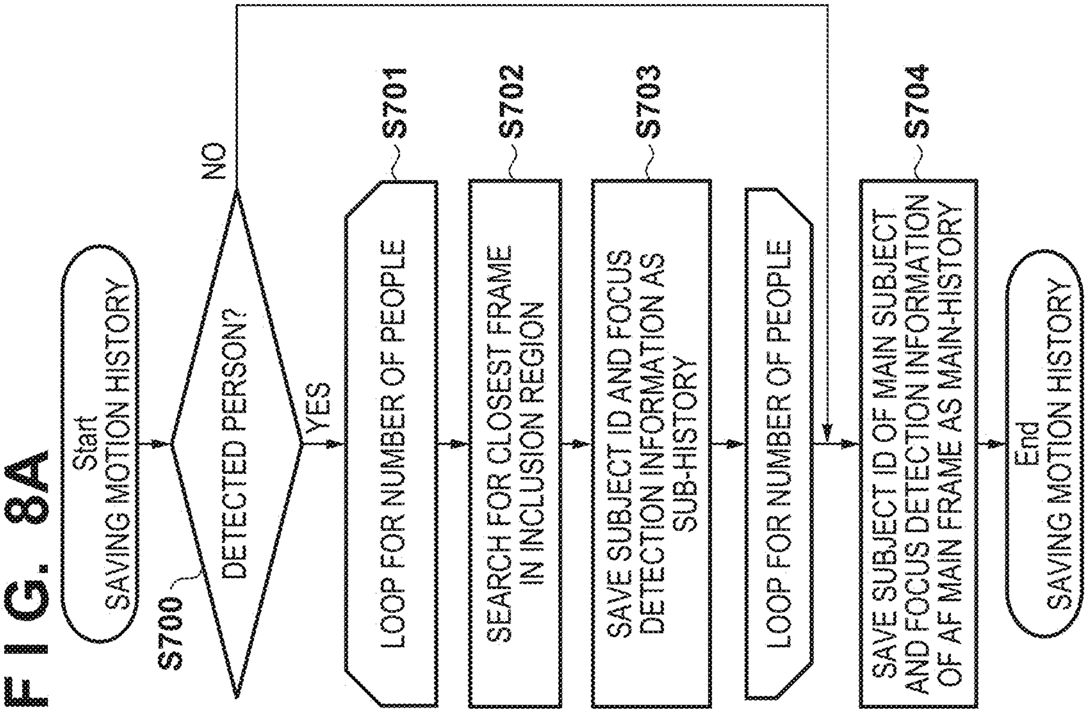
FIG. 8A is a flowchart illustrating motion history saving process.

FIG. 8A is a flowchart describing the motion history saving operation in step S403 in FIG. 5.

First, in step S700, the system control unit 209 determines whether or not a person is detected by the subject detection unit 211. If a person is detected, the system control unit 209 proceeds the process to step S701, and if not detected, the system control unit proceeds the process to step S704.

In step S701, the system control unit 209 performs loop processing for the number of detected people.

In step S702, the system control unit 209 selects the AF frame in which the closest focus detection result has been calculated in the inclusion region D obtained in FIG. 4A for the person to be processed.

Figure 8B:
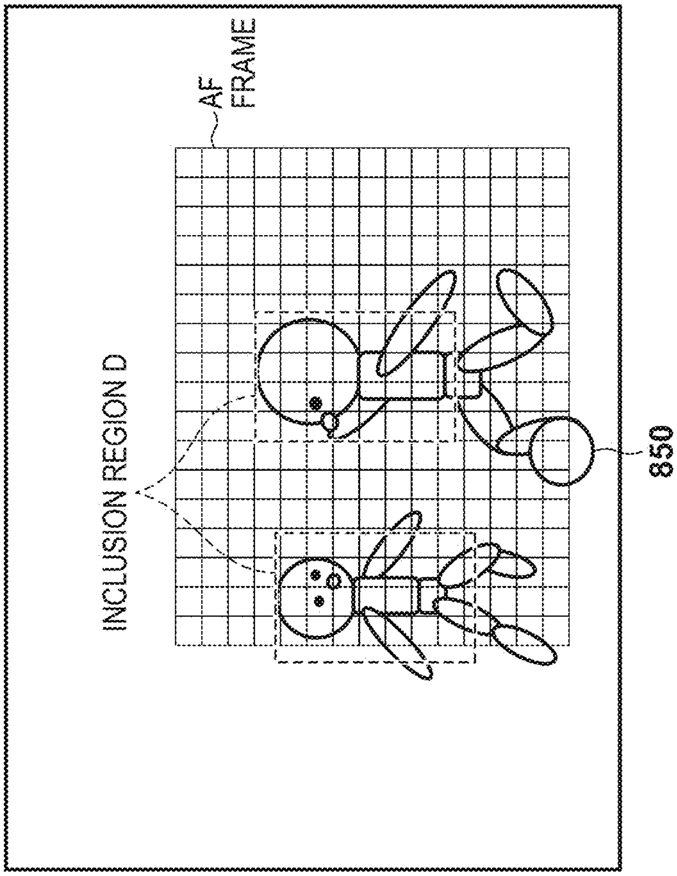
FIG. 8B is a conceptual diagram of a subject inclusion frame at the time of saving the motion history.

The concept is illustrated in FIG. 8B. For each detected subject in FIG. 8B, the AF frame in which the closest focus detection information has been calculated is searched for within the inclusion frame D (dotted line). At this time, in a case where the subject is out of the AF area, the AF frame size, the number of frames, and the like may be increased so that as many AF frames are applied to the detected subject as much as possible. In addition, in a case where there are a plurality of subjects that have caused an action, as illustrated in FIG. 8B, something that can identify a main subject in a sports scene, such as the ball 850, may be detected, and an action subject close to that something may be identified as the main subject.

In step S703, the system control unit 209 saves the subject ID and the focus detection information (focus position information) of the AF frame selected in step S702 in the DRAM as the motion history of the sub-subject (hereinafter referred to as sub-history). This process is performed for the number of detected people.

In step S704, the system control unit 209 saves the subject ID of the main subject and the focus detection result of the AF frame corresponding to the main subject in the DRAM as the motion history of the main subject (hereinafter referred to as main history). Note that the main subject mentioned here is a subject corresponding to the AF frame (main frame) selected in the main frame selecting process of FIGS. 7A to 7C.

<Moving Object Prediction Processing>

Figure 9:
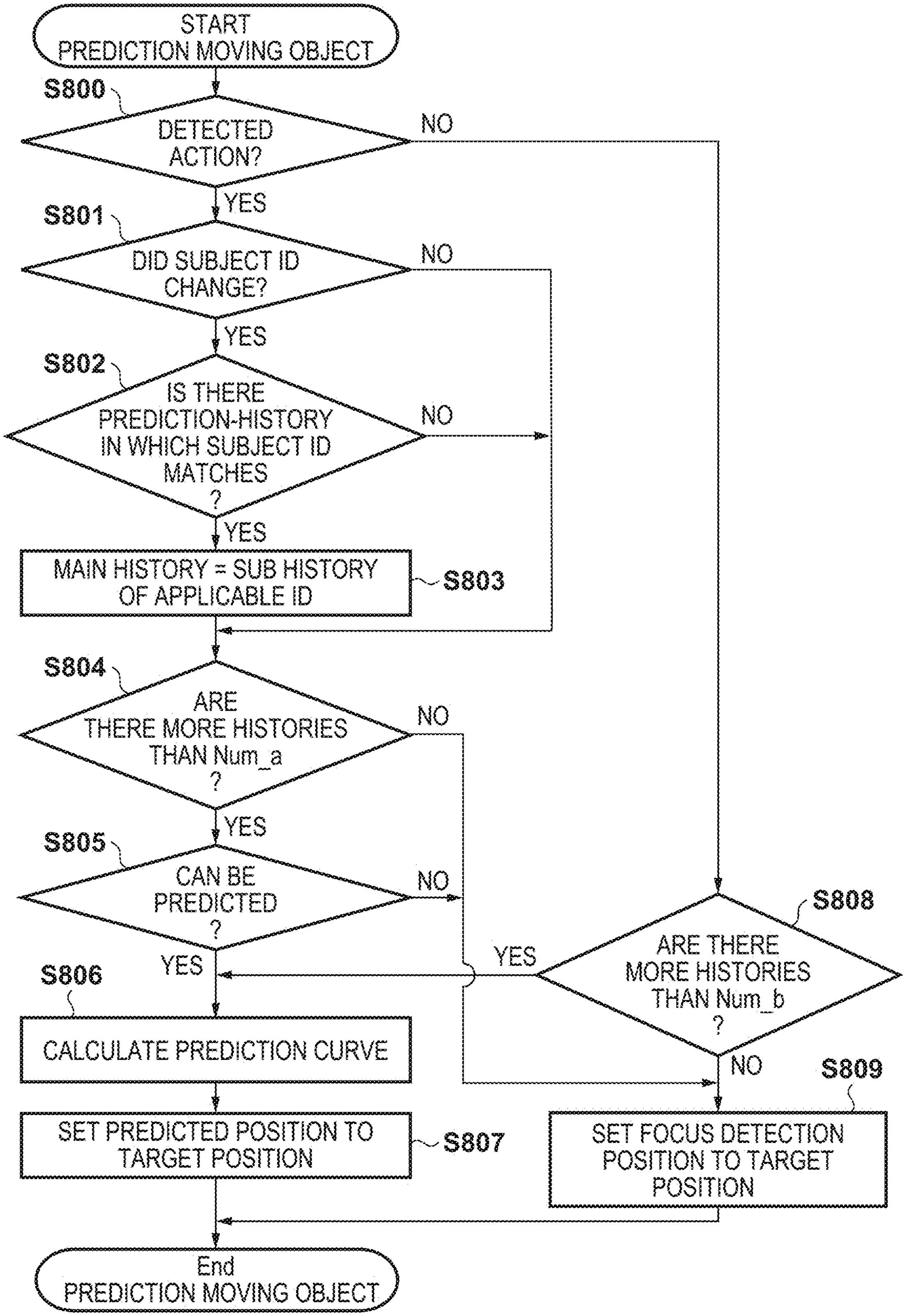
FIG. 9 is a flowchart illustrating an operation of moving object prediction.

FIG. 9 is a flowchart for describing the prediction operation using the motion history saved in step S703 and step S704 of FIG. 8A.

In step S800, the system control unit 209 determines whether or not an action is detected in the subject in the screen by the above-described method. If an action is detected, the system control unit 209 proceeds the process to step S801, and if not detected, the system control unit proceeds the process to step S808.

In step S801, the system control unit 209 determines whether or not the subject ID has changed from that of the currently focused subject when focusing on the subject in which action detection is performed. If the subject ID has changed, the system control unit 209 proceeds the process to step S802, and if not detected, the system control unit proceeds the process to step S804.

This is because it is desired to immediately shift the focus to the subject that has caused the action to track the focus, but it is necessary to predict the motion of the subject using the motion history information for the subject and focus on the subject. Therefore, the process proceeds to step S802.

In step S802, whether or not there is a motion history that matches the subject ID in which action detection is performed is searched for in the sub-histories saved in step S703 in FIG. 8A. If there is a sub-history in which the subject ID matches, the system control unit 209 proceeds the process to step S803, and if not, proceeds the process to step S804.

In step S803, the system control unit 209 updates the main history with the located sub-history. At this time, a condition for restricting the subject transfer is relieved. For example, control for detecting a change in the focus detection result greater than or equal to a predetermined value and limiting the focus tracking is not performed.

In step S804, the system control unit 209 determines whether or not the number of histories of greater than or equal to Num_a is saved (whether or not greater than or equal to a predetermined number are saved). If the number of histories of greater than or equal to Num_a is saved, the system control unit 209 proceeds the process to step S805, and if the number of histories of greater than or equal to Num_a is not stored, the system control unit proceeds the process to step S809.

In step S805, the system control unit 209 determines whether or not the motion can be predicted. In the present embodiment, it is determined that the prediction is not possible in a case where a change in the value of the focus detection information in the saved history is greater than or equal to a predetermined threshold value (e.g., a subject whose position is separated by greater than or equal to 10 depths in depth conversion), and in a case where the variation of the value is greater than or equal to a predetermined value (e.g., calculated by 36 or the like from the focus detection result). This condition is determined based on a factor that causes a large error with respect to a predicted position to be described later.

Figure 10:
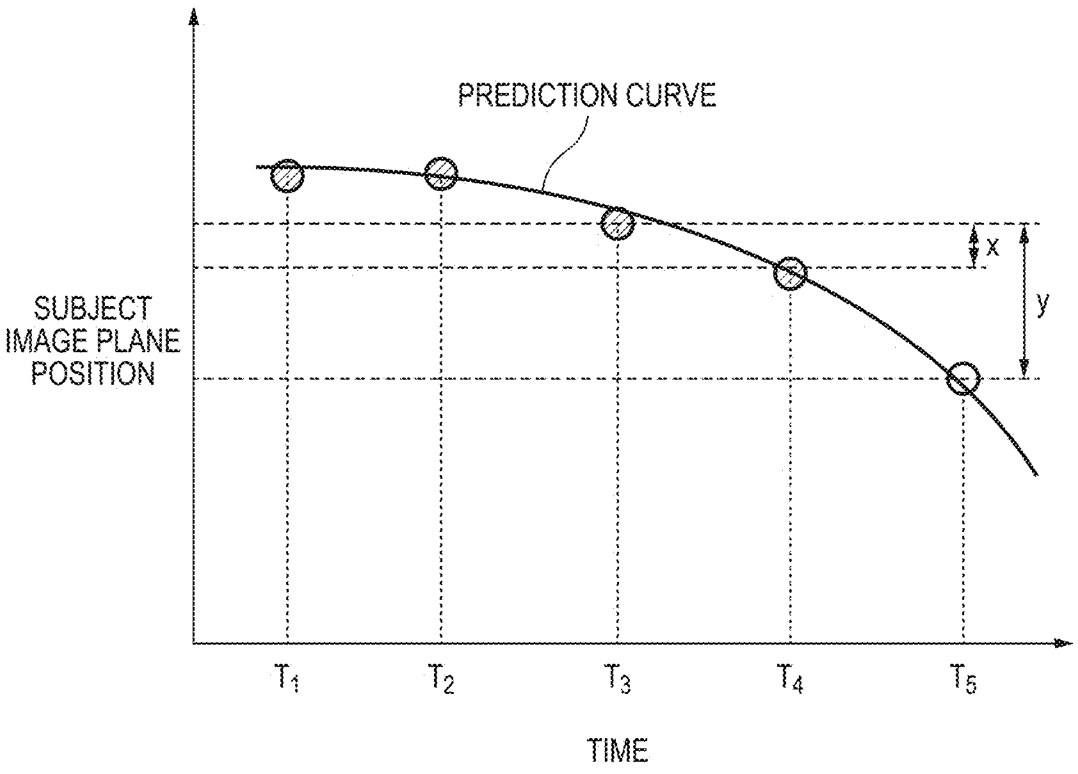
FIG. 10 is a conceptual diagram of a prediction curve.

In step S806, the system control unit 209 calculates a motion prediction curve as illustrated in FIG. 10.

In step S807, the system control unit 209 sets the predicted position of the subject as the target position for lens driving based on the prediction curve obtained in step S806.

In step S808, the system control unit 209 determines whether or not the number of histories of greater than or equal to Num_b is saved. In this case, the magnitude relationship of Num_a and Num_b is set as follows.

$$\text{Num\_a} < \text{Num\_b} \quad (1)$$

The relationship of the above formula (1) is adopted in order to make prediction as easy to use as possible since there is a high possibility that the subject at the time of action detection is in a state of a subject suitable as the timing at the time of photographing a sports scene, the time for continuing the action is shorter than the normal motion, and there is a high possibility that the subject is also moving in the distance direction. As a result, it is possible to increase the success probability at the time of photographing a sports scene of high difficulty.

In step S809, since the condition is not predictable, the system control unit 209 sets the focus detection position as it is as the target position for lens driving.

In the present embodiment, by saving the history of the sub-subject that is the candidate of the main subject in this way, when the focus is shifted from the main subject to the sub-subject by the action detection, the motion of the sub-subject of the shift destination can be immediately predicted and focus tracking can be performed. As a result, it is possible to provide an in-focus image at a suitable timing in a sports scene or the like.

<Prediction Curve Calculation Process>

FIG. 10 is a prediction curve obtained using the main history saved in step S704 of FIG. 8A. The vertical axis represents the subject image plane position obtained from the defocus amount calculated from step S401 in FIG. 5, and the horizontal axis represents time. In addition, the larger the image plane position on the vertical axis, the farther the distance is, and the history in the drawing illustrates a state of tracking a subject approaching the photographer (camera).

The focus adjustment process is periodically performed, and times T1 to T5 are each execution times of the focus adjustment process. The predicted driving amount is obtained, for example, by deriving a prediction curve by a collective least squares method using a past image plane position and each focus detection time and calculating an image plane position (focus adjustment position) at a prediction destination time based on the curve. That is, the lens is driven at time T4, and the lens driving corresponding to the defocus y for aiming focus at time T5 is requested.

As described above, according to the method of the present embodiment, it is possible to provide a focused image at a suitable timing in a sports scene or the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-195297, filed Nov. 16, 2023, which is hereby incorporated by reference herein in its entirety.

What is claimed is:

1. A focus adjustment apparatus comprising at least one processor or circuit configured to function as:

a subject detection unit configured to detect a plurality of subjects from an image;

a state detection unit configured to detect a specific state of a subject from the image;

a focus detection unit configured to acquire, for each of the plurality of subjects detected by the subject detection unit, a history of focus detection results corresponding to each of the plurality of subjects detected by the subject detection unit;

a focus adjustment unit configured to focus on a subject;

a control unit configured to cause the focus detection unit to acquire the history of the focus detection results during detection processing of the specific state by the state detection unit; and a prediction unit configured to predict, when the focus adjustment unit shifts from a state of focusing on a first subject to a state of focusing on a second subject for which the specific state is detected, a focus adjustment position for the focus adjustment unit to focus on the second subject based on the history of the focus detection results of the second subject acquired by the focus detection unit.

2. The focus adjustment apparatus according to claim 1, wherein the state detection unit is configured to detect the specific state of a subject from a feature amount of the subject, and wherein the focus adjustment unit shifts from a state of focusing on the first subject to a state of focusing on the second subject when the specific state is detected for the second subject.

3. The focus adjustment apparatus according to claim 2, wherein the specific state is a state in which the subject has performed a specific action.

4. The focus adjustment apparatus according to claim 1, wherein the at least one processor or circuit is configured to further function as a setting unit configured to set a plurality of focus detection regions in a screen, wherein the focus detection unit is configured to acquire, for a subject, the history of the focus detection results indicating a change in a focus position in the plurality of focus detection regions.

5. The focus adjustment apparatus according to claim 4, wherein the prediction unit predicts the focus adjustment position for focusing on the second subject when a number of focus detection results included in the history of the focus detection results of the second subject is greater than or equal to a predetermined number.

6. The focus adjustment apparatus according to claim 4, wherein the prediction unit does not predict the focus adjustment position for focusing on the second subject when a difference or variation in focus positions indicated by the history of the focus detection results of the second subject is greater than or equal to a predetermined value.

7. The focus adjustment apparatus according to claim 4, wherein the focus detection unit is configured to acquire closest focus detection information among focus detection results obtained in the plurality of focus detection regions with respect to a subject as information included in the history of the focus detection results.

8. An image capturing apparatus comprising:

an imaging device configured to capture an image of a subject; and the focus adjustment apparatus according to claim 1.

9. A focus adjustment method comprising:

executing subject detection for detecting a subject plurality of subjects from an image;

executing a state detection for detecting a specific state of a subject from the image;

executing a focus detection for acquiring, for each of the plurality of subjects detected in the subject detection, a history of focus detection results corresponding to each of the plurality of subjects detected in the subject detection unit;

executing focus adjustment for focusing on a subject;

executing a control for causing the focus detection to acquire the history of the focus detection results during detection processing of the specific state in the state detection; and predicting, when shifting from a state of focusing on a first subject to a state of focusing on a second subject for which the specific state is detected in the focus adjustment, a focus adjustment position for focusing on the second subject in the focus adjustment based on the history of the focus detection results of the second subject acquired in the focus detection.

10. A non-transitory computer-readable storage medium storing a program for causing a computer to execute each step of a focus adjustment method, the focus adjustment method comprising executing subject detection for detecting a subject from an image;

executing a state detection for detecting a specific state of a subject from the image;

executing a focus detection for acquiring, for each of the plurality of subjects detected in the subject detection, a history of focus detection results corresponding to each of the plurality of subjects detected in the subject detection unit;

executing focus adjustment for focusing on a subject;

executing a control for causing the focus detection to acquire the history of the focus detection results during detection processing of the specific state in the state detection; and predicting, when shifting from a state of focusing on a first subject to a state of focusing on a second subject for which the specific state is detected in the focus adjustment, a focus adjustment position for focusing on the second subject in the focus adjustment based on the history of the focus detection results of the second subject acquired in the focus detection.

* * * * *